Oct. 1, 1940. E. C. WOLFERZ 2,216,481
COUPLER
Filed Nov. 12, 1938
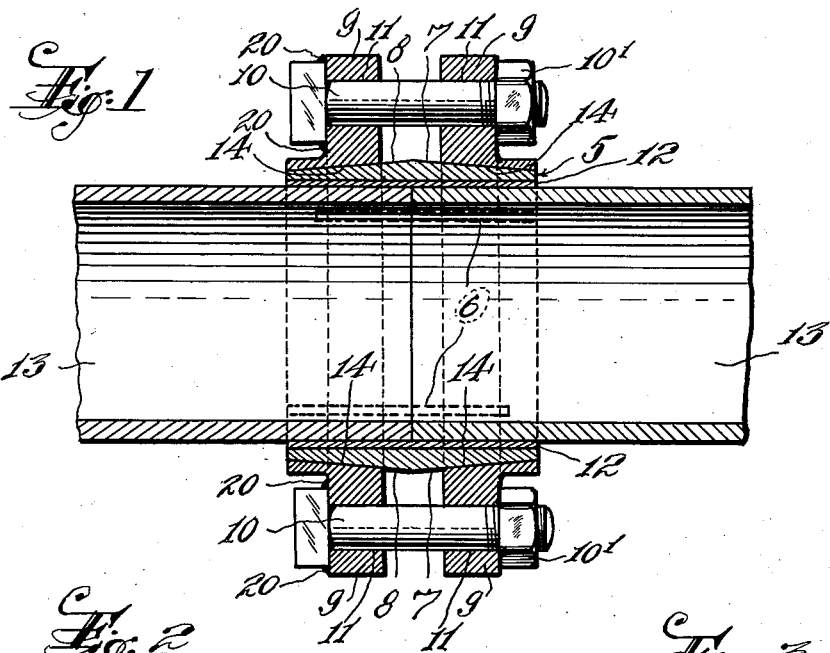

Patented Oct. 1, 1940

2,216,481

UNITED STATES PATENT OFFICE 2,216,481

COUPLER

Edwin C. Wolferz, Nutley, N. J.

Application November 12, 1938, Serial No. 239,949

1 Claim. (Cl. 285—132)

This invention relates to improvements in couplers, and more particularly to improvements in couplers for connecting pipe sections.

Technological advances have resulted in widespread use of piping for conveying liquids, solids and gases, pipes being made of various alloys according to their intended use. Couplers made of a given metal, while suited for use with pipes of certain alloys, do not embody resistance and sanitation characteristics of other alloys and therefore are unsuitable for use with all pipes. For example, stainless steel couplers have been found, in practise, wholly unsuited for use in connection with pipes for conveying certain acids and for other uses.

It is an object of my invention to provide a pipe coupler adapted to be used with equal efficacy in connection with pipes of various alloys.

A further object of my invention is to provide a pipe coupler including a sleeve adapted to receive the ends of the pipe sections to be joined, the sleeve being of the same metal as the pipe sections and being contracted thereon to size by a novel, slotted annulus, the latter being outwardly bevelled in cross section and being contracted on the sleeve by flange plates drawn up on the bevelled portions of the annulus.

A further object of my invention is to provide a coupler by means of which pipe sections may be secured together in a minimum time, in a manner which assures a liquid, pressure-tight, practically homogeneous seal.

A further object of my invention is to provide a pipe coupler consisting of relatively few parts, which may be readily assembled on the pipe sections without the necessity of using special tools and which, after being initially installed, becomes, for all practical purposes, a permanent part of the system.

A further object of my invention is to provide a pipe coupler which may be readily disassembled for access to the pipe sections.

In the drawing,

Fig. 1 is a longitudinal sectional view of a pipe coupler embodying my invention, in operative position, with pipe sections coupled therein, Fig. 2 is a perspective view of the annulus and sleeve of my coupler, Fig. 3 is a transverse sectional view taken on line 3—3 of Fig. 2, and Fig. 4 is a perspective view of a modified form of annulus and sleeve for use in connection with my coupler.

As shown in Fig. 1, my improved coupler consists of an annulus 5 provided with a plurality of circumferentially spaced, transversely extending slots 6. The annulus is outwardly bevelled in cross section as shown in Fig. 1, to provide bevel surfaces 7, 8, on which correspondingly bevelled flanges 14 of plates 9 are adapted to be drawn up by a plurality of bolts 10 passing through apertures 11 in the plates and engaged by nuts 10', or by other suitable means, to contract the annulus 5 on the sleeve 12. The bolts 10 are preferably tack welded or otherwise secured to one plate 9 as indicated at 20 so that by simply threading the nuts 10' on the ends of the bolts, the plates 9 will be drawn together, as shown in Fig. 1. The sleeve 12 is preferably of the same alloy as that of pipe sections 13, or of an alloy having the same essential characteristics. The other parts of the coupler may be of any standard, inexpensive alloy. The sleeve 12 preferably has an internal diameter slightly greater than the external diameter of pipe sections 13, so that the latter may be manually tight fitted into the sleeve. The sleeve is tightly received in the annulus 5 and when the bolts 10 are drawn up, the annulus 5 contracts the sleeve 12 to size on the pipe sections 13. The abutting ends of pipe sections 13 are overlapped by the sleeve 12, which forms a practically homogeneous, liquid and pressure tight seal; as the sleeve is preferably of the same alloy as the pipe sections 13, the coupler will have all of the resistant and other characteristics of the pipe sections 13, although only one of the coupler parts—the sleeve 12, is of the special alloy.

In Fig. 4 there is shown a modification of my invention wherein the annulus 5 is longitudinally split at 15 to facilitate its contraction on the sleeve 12.

Instead of providing the plates 9 with bolts 10 to draw the plates together, any other means may be used for attaining the same end within the scope of my invention. For example, the flanges 14 of plate 9 may be threaded for engagement with external threads on the annulus 5.

From the foregoing it will be seen that I have provided a coupler to be used for securing two lengths of pipe sections together, without the necessity of welding, flaring, brazing, soldering or tinning. The coupler provides a joint which is pressure and liquid tight against internal pressure, as well as liquid tight against acids, alkalis or other compounds which the pipe sections resist.

Having thus described my invention, what I claim as new and desire to secure by Letters Patent, is:

A coupling for the abutting ends of metal pipe sections to provide a substantially homogeneous joint of the material of the pipe sections, comprising a contractable annulus provided with an externally bevelled portion, a continuous sleeve positioned in said annulus and overlapping the abutting ends of said pipe sections, said sleeve being made of the same metal as the pipe sections, and fitting tightly over the abutting ends, plates provided with bevelled portions to correspond to the bevelled portions of said annulus and positioned thereon, and means to draw said plates together to contract the annulus and thereby contract the sleeve to size on the pipe sections and form a substantially homogeneous, liquid and pressure tight seal at the abutting ends of the pipe sections.

EDWIN C. WOLFERZ.